US010367910B2

(12) United States Patent
Shiell et al.

(10) Patent No.: US 10,367,910 B2
(45) Date of Patent: *Jul. 30, 2019

(54) INSTANTANEOUS NON-BLOCKING CONTENT PURGING IN A DISTRIBUTED PLATFORM

(71) Applicant: Verizon Digital Media Services Inc., Playa Vista, CA (US)

(72) Inventors: Derek Shiell, Los Angeles, CA (US); Robert J. Peters, Santa Monica, CA (US); Amir Khakpour, Santa Monica, CA (US); Alexander A. Kazerani, Santa Monica, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 15/137,357

(22) Filed: Apr. 25, 2016

(65) Prior Publication Data

US 2016/0241670 A1    Aug. 18, 2016

Related U.S. Application Data

(63) Continuation of application No. 14/036,746, filed on Sep. 25, 2013, now Pat. No. 9,413,842.

(51) Int. Cl.
| | | |
|---|---|---|
| G06F 15/16 | (2006.01) | |
| H04L 29/08 | (2006.01) | |
| G06F 12/126 | (2016.01) | |
| H04L 12/26 | (2006.01) | |

(52) U.S. Cl.
CPC ........ *H04L 67/2852* (2013.01); *G06F 12/126* (2013.01); *H04L 43/106* (2013.01); *H04L 67/2842* (2013.01)

(58) Field of Classification Search
CPC .......... G06F 17/30587; G06F 17/3089; G06F 17/30902; G06F 11/1453; H04L 67/2842
See application file for complete search history.

(56) References Cited

U.S. PATENT DOCUMENTS

| | | |
|---|---|---|
| 6,216,212 B1 | 4/2001 | Challenger et al. |
| 6,757,708 B1 | 6/2004 | Craig et al. |

(Continued)

*Primary Examiner* — Dustin Nguyen
(74) *Attorney, Agent, or Firm* — Ansari Katiraei LLP; Arman Katiraei; Sadiq Ansari

(57) ABSTRACT

Some embodiments provide instantaneous and non-blocking content purging across storage servers of a distributed platform. When a server receives a purge operation, it extracts an identifier from the purge operation. The server then generates a content purge pattern from the identifier and injects the pattern to its configuration. Instantaneous purging is then realized as the server averts access to any cached content identified by the pattern. The purging also occurs in a non-blocking fashion as the physical purge of the content occurs in-line with the server's cache miss operation. The content purge pattern causes the server to respond to a subsequently received content request with a cache miss, whereby the server retrieves the requested content from an origin source, serves the retrieved content to the requesting user, and replaces a previously cached copy of the content that is to be purged with the newly retrieved copy.

16 Claims, 11 Drawing Sheets

(56) References Cited

U.S. PATENT DOCUMENTS

| | | | |
|---|---|---|---|
| 7,111,057 B1* | 9/2006 | Sherman | G06F 17/3089 707/999.01 |
| 8,117,276 B1 | 2/2012 | Sakata et al. | |
| 2003/0014603 A1 | 1/2003 | Sasaki et al. | |
| 2005/0223277 A1* | 10/2005 | Ballard | G06F 11/1453 714/15 |
| 2006/0069746 A1* | 3/2006 | Davis | H04L 67/2842 709/218 |
| 2007/0233638 A1* | 10/2007 | Carroll | G06F 17/30587 |
| 2012/0089700 A1* | 4/2012 | Safruti | H04L 67/2842 709/217 |
| 2012/0246257 A1* | 9/2012 | Brown | G06F 17/30902 709/213 |
| 2013/0145099 A1* | 6/2013 | Liu | H04L 67/2842 711/133 |
| 2014/0181285 A1 | 6/2014 | Stevens et al. | |
| 2014/0280515 A1 | 9/2014 | Wei et al. | |

* cited by examiner

```
URLs:
   http://distributedplat.net/CustA/foo*  ←910
   http://distributedplat.net/CustA/bar*  ←920

Cache Keys:
   /cache/CustA/foo*:/c  ←930
   /cache/CustA/bar*:/c  ←940

JSON Content Purge Pattern Data:
{
  "data" : [
    {
      "regex" : "^(?:foo[^/]*|bar[^/]*)$",  ←950
      "cid" : 11847,  ←980
      "path" : "/cache/CustA/"  ←960
    },
    {
      "regex" : "^(?:foo[^/]*|bar[^/]*)$",  ←950
      "cid" : 11847,  ←980
      "path" : "/cache/CustA/"  ←970
    },
  ],
  "id" : -101929084,  ←990
  "invalid-ts" : 1374691425586928  ←995
}
```

Figure 9

Customer ID: CustA ← 1010
path: cache
 path: CustA  ── 1020
  ts: 1374692257069935 id: -664341946 regex: ^(?:bar[^/]*\:|foo[^/]*\:)/ ← 1030
  ts: 1374692257069933 id: -664341946 regex: ^(?:foo[^/]*|bar[^/]*)$ ← 1040
 path: https
Customer ID: CustB
 path: ...

INSTANTANEOUS NON-BLOCKING CONTENT PURGING IN A DISTRIBUTED PLATFORM

CLAIM OF BENEFIT TO RELATED APPLICATIONS

This application is a continuation of U.S. nonprovisional patent application Ser. No. 14/036,746 entitled "Instantaneous Non-Blocking Content Purging in a Distributed Platform", filed Sep. 25, 2013. The contents of application Ser. No. 14/036,746 are hereby incorporated by reference.

TECHNICAL FIELD

The present invention relates to distributed platforms, such as content delivery networks, and more specifically, to the purging of content therein.

BACKGROUND ART

A distributed platform involves a set of interoperating servers. The collective footprint of the set of servers provides a computational resource that is scalable, fault tolerant, and able to withstand heavy computational workloads. When such a distributed platform is a content delivery network (CDN), the set of servers provides a shared computing resource that is leveraged for the wide scale and optimized dissemination of content for numerous CDN customers. Specifically, the set of servers interoperates to cache the CDN customer content at multiple geographic locations and to serve the cached in an optimized fashion in order to reduce latency while providing security, failover via redundancy, and other benefits.

FIG. 1 depicts an exemplary Content Delivery Network (CDN) architecture providing optimized content delivery on behalf of various content provider customers of the CDN. As shown, the CDN includes several different caching Points-of-Presence (PoPs) 110, traffic management servers 120, and an administrative server 130. The figure also illustrates the interactions that CDN customers, including content providers, have with the CDN and interactions that content consumers or end users have with the CDN.

Each PoP 110 may be representative of a server farm for a geographically proximate set of physically separate servers or a set of virtual servers that execute over partitioned sets of resources of one or more physically separate servers. The PoPs are distributed across different network edges of the Internet. The servers in each respective PoP cache and serve content on behalf of different content providers to end users, thus facilitating the "last mile" delivery of content. Hence, the PoP servers are referred to as "edge servers", "storage servers", or "caching servers". A caching server may cache the same content as other caching servers in the same PoP or may be configured to cache different content than the other caching servers in the same PoP.

The traffic management servers 120 route end users, and more specifically, end user issued requests for content to one or more caching servers that can optimally deliver the requested content back to the end users. In many cases, the optimal caching server is a server caching the requested content in a PoP that is geographically closest to the end user that issued the content request. Different CDN implementations utilize different traffic management schemes to achieve such routing to the optimal caching servers. For example, the traffic management scheme can be conducted according to Anycast routing. However, other traffic management schemes, such as Domain Name System (DNS) routing, can alternatively be used and the traffic management servers 120 can include different combinations of DNS servers, load balancers, and routers performing Anycast, DNS, or Border Gateway Protocol (BGP) routing as some examples.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, upload content, and perform operations, such as purge operations, to manage, update, and customize their CDN configuration and content. The administrative server 130 also aggregates statistics data from each server of the set of caching servers and processes the statistics to produce usage and performance reports for the customers.

In any distributed platform, such as the CDN depicted in FIG. 1, seemingly trivial operations become significantly more complex and challenging when those operations have to be coordinated and executed across the set of servers. Content purging is one such operation. Content purging involves the removal of content or the removal of the one or more files that represent the content from the set of servers.

Content purging in a distributed platform is typically conducted in one of two ways. In a first scenario, the distributed platform monitors which servers host which content in order to target the purge operation to the servers that actually host the content that is to be purged. This monitoring and server targeting introduces overhead, complexity, and lag which is only exacerbated when supporting wildcard purging, purges involving query string parameters, compressed files, or "hot" files (i.e., files that are replicated to other servers during a temporary period of high demand). This scenario also can become untenable when the distributed platform is a CDN. CDN caching servers frequently change the content they cache. The messaging needed to convey the cache changes would unnecessarily occupy caching server resources, thereby degrading their overall responsiveness and content delivery performance.

In an alternate scenario, the distributed platform sends each purge operation to all servers of the distributed platform for execution irrespective of whether or not those servers actually host the content designated for purging. This scenario is more typical for a CDN, but also resource and time intensive. To confirm execution of a purge operation, the distributed platform awaits confirmation from each of the servers that the purge has been completed. To complete the purge, each server that hosts the content performs a resource intensive file system traversal and write operation to locate and expunge the targeted files or directories. Compared to processor computations, file system operations, such as the write operation, are several magnitudes slower. The file system operations can also be blocking. In other words, file system reads and writes cannot be performed concurrently due to resource contention. This is especially problematic for the CDN caching servers.

The CDN caching servers continually perform read operations in order to serve content from cache in response to requests from content consumers. However, the CDN caching servers are also continually performing write operations by changing or maintaining the contents of their cache and removing content in response to CDN customer purge operations. In such cases, either the write operation or the read operation may block the file system, thus preventing the other operation from completing. When a purge takes several seconds to complete due to large file sizes or a large number of files being purged, the caching server is unable to respond to the incoming content requests, thereby creating a bottleneck and degrading the overall content delivery performance of the distributed platform. To avoid this bottleneck potential, some servers delay the purge until they experience some momentary downtime or period of inactivity in which they can safely perform the purge without impacting primary operation of the server. This however further prolongs the amount of time needed to complete a purge. Such a significant delay is unacceptable for on-demand or real-time services.

For these and other reasons, most distributed platforms do not and cannot offer instantaneous or on-demand removal of files. The customers of these distributed platforms often wait several minutes before their issued purge operations are executed. Accordingly, there is a need for a solution that improves purging in a distributed platform. More specifically, there is a need for instantaneous non-blocking purging systems and methodologies for a distributed platform.

SUMMARY OF THE INVENTION

Some embodiments provide systems and methods for implementing instantaneous and non-blocking content purging across storage servers of a distributed platform. The storage servers include two or more servers that cache, host, or otherwise disseminate content for the distributed platform or on behalf of customers of the distributed platform.

Customer purge operations are distributed to the storage servers. Each purge operation contains an identifier. The identifier identifies one or more content or files that have been designated for purging. Purging involves removing copies of the designated content or files from the storage servers.

When a storage server receives a purge operation, the storage server extracts the identifier from the purge operation. The storage server then generates a content purge pattern from the identifier. The storage server associates a timestamp with the content purge pattern. The storage server injects the content purge pattern in the server's operational configuration. The operational configuration controls operation of the storage server by at least specifying what content that storage server caches, hosts, or disseminates.

The injected content purge pattern effectively purges the content by causing the storage server to treat a subsequent request for the designated purged content as a cache miss. Specifically, when the storage server receives a content request, the storage server extracts an identifier from the content request. The content request identifier identifies the content that is being requested. The storage server performs a status lookup using the identifier to determine whether a copy of the content is stored by the storage server.

When the status lookup reveals that the storage server does not store a copy of the content, there is no content to purge and the content request results in a cache miss. The storage server then retrieves a new copy of the content from an origin source, stores the new copy of the content locally with an associated timestamp, and forwards the new copy of the content to the requesting user.

When the status lookup reveals that a copy of the content is stored to the storage server, the storage server obtains a timestamp that is associated with the stored copy of the content. The timestamp identifies when the content was last updated or when it was stored by the storage server. Next, the storage server compares the content request identifier against the content purge patterns that have been injected into the storage server configuration.

If the content request identifier does not match any of the content purge patterns in the configuration, then the requested content has not been designated for purging. Accordingly, the storage server passes the stored copy of the content to the requesting user.

If the content request identifier matches a content purge pattern in the configuration, the storage server determines whether the stored copy of the content has been purged and refreshed since the issuance of the purge operation. To make this determination, the storage server compares the timestamp of the matching content purge pattern to the timestamp of the stored content that was retrieved using the status lookup.

The content has not been purged when the content purge pattern timestamp is older than the timestamp of the stored content. In such cases, the storage server responds to the content request by forwarding the stored copy of the content to the requesting end user.

The content has not been purged when the content purge pattern timestamp is newer than the timestamp of the stored content. In such cases, the storage server effectively and instantaneously purges the stored copy of the content by treating the request as a cache miss. In so doing, the server prevents any content consumer from accessing the cached copy of the content as if it were physically removed from the server. The physical purge, however, occurs once the content is refreshed according to the server's cache miss response. Moreover, performing the physical purge inline with the server's cache miss response allows the purge to occur in a non-blocking manner. In other words, the physical purge occurs as part of the storage server's normal response to a cache miss, such that the server's primary function of responding to content requests is never interrupted solely for the purpose of purging content. Thus, according to the server's cache miss response, the storage server retrieves a new copy of the content from an origin source. The new copy of the content is then used to replace the previous copy and the storage server serves the new copy of the content to the requesting user.

BRIEF DESCRIPTION OF THE DRAWINGS

In order to achieve a better understanding of the nature of the present invention, a preferred embodiment for the instantaneous non-blocking purge systems and methodologies will now be described, by way of example only, with reference to the accompanying drawings in which:

FIG. 9 provides an example illustrating content purge pattern generation from various content identifiers in accordance with some embodiments.

FIG. 10 illustrates an exemplary content purge pattern hierarchical organization in accordance with some embodiments.

DETAILED DESCRIPTION

In the following detailed description, numerous details, examples, and embodiments for the instantaneous non-blocking purge systems and methods are set forth and described. It will be clear and apparent to one skilled in the art that these systems and methods are not limited to the embodiments set forth and that the systems and methods may be practiced without some of the specific details and examples discussed.

Figure 1:
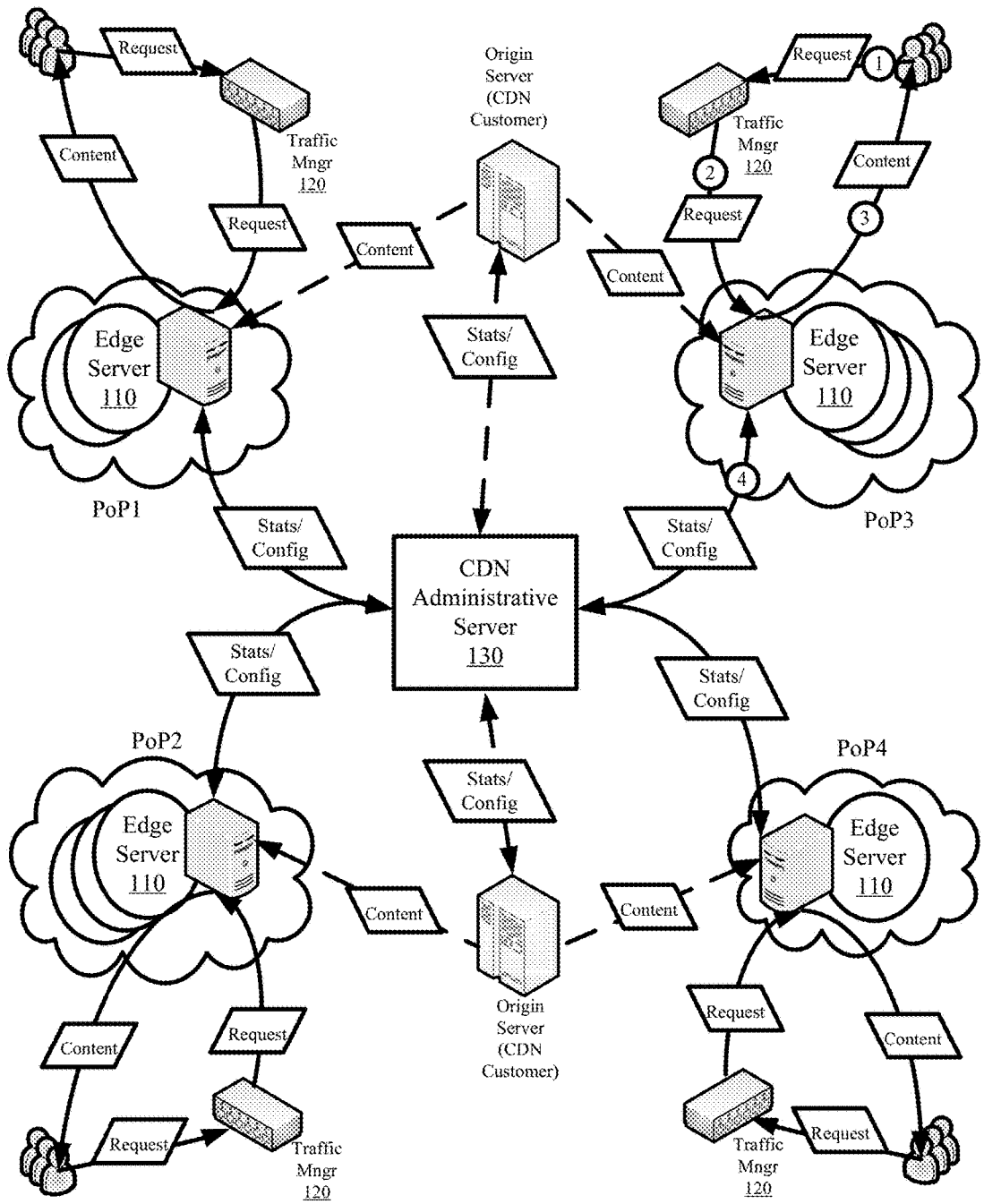
FIG. 1 depicts an exemplary Content Delivery Network (CDN) architecture providing optimized content delivery on behalf of various content provider customers of the CDN.

Some embodiments provide systems and methods for efficient purging in a distributed platform, wherein the distributed platform operates a set of storage servers. The set of storage servers may be operable to provide a shared resource for customers of the distributed platform to use. The set of storage servers may also be operable to implement one or more services of the distributed platform. In any regard, the set of storage servers includes two or more servers, each server having at least a processor and a non-transitory computer readable storage medium, and each server operable to cache, host, or otherwise disseminate content for the distributed platform or on behalf of customers of the distributed platform. A content delivery network (CDN), such as the one depicted in FIG. 1, is representative of the distributed platform of some embodiments. However, the systems and methods disclosed herein are not limited to a CDN implementation of a distributed platform, but are suitable for other general applications.

Figure 2:
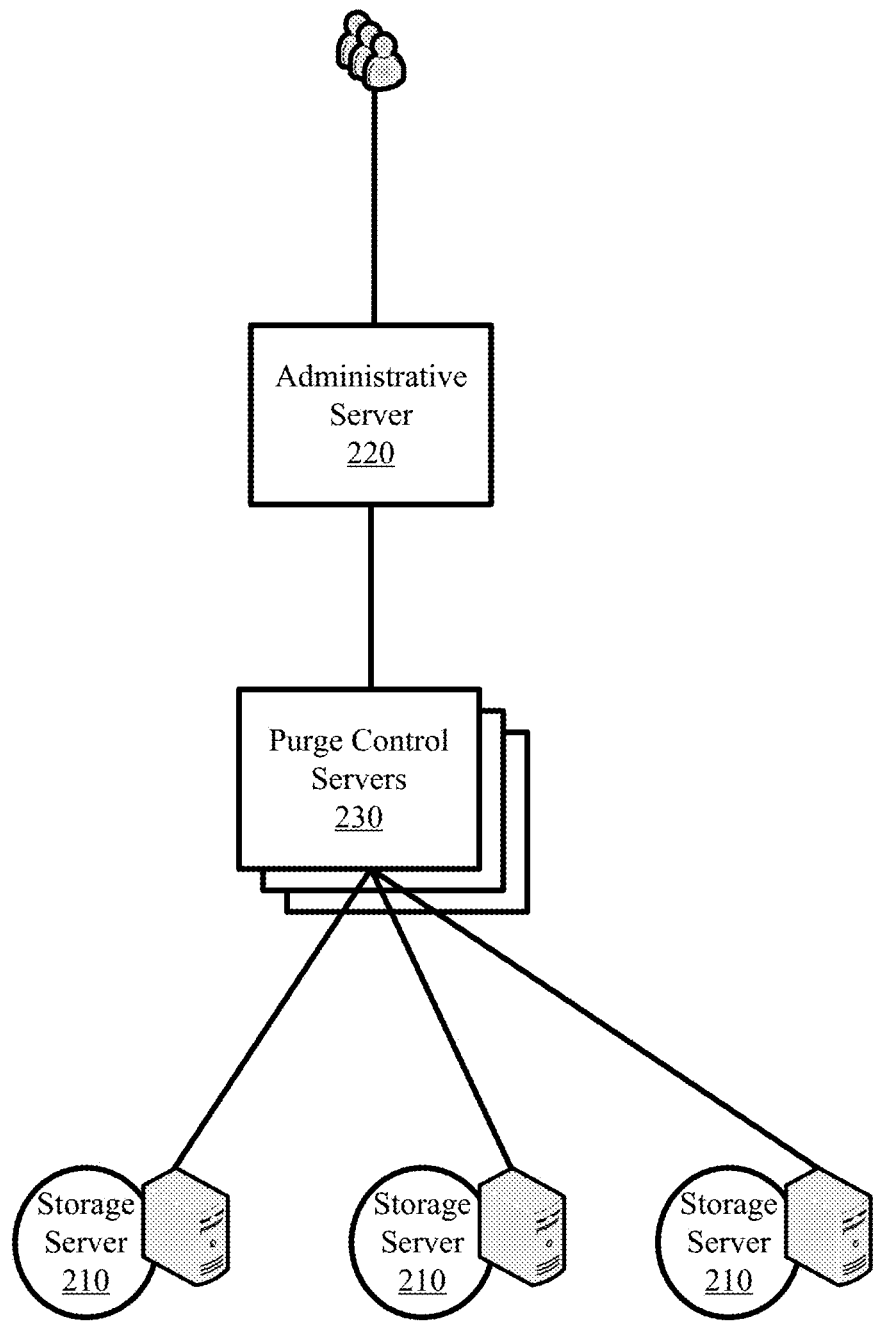
FIG. 2 presents an exemplary architecture for a distributed platform implementing the instantaneous non-blocking purge systems and methods of some embodiments.

FIG. 2 presents an exemplary architecture for a distributed platform implementing the instantaneous non-blocking purge systems and methods of some embodiments. The figure illustrates a set of storage servers 210, one or more administrative servers 220, and purge control servers 230.

The set of storage servers 210 stores the content that can be purged. These servers 210 can include caching servers of a CDN, hosting servers of a hosting service, transactional servers of an ecommerce site, etc. The set of storage servers 210 can be collocated in one geographic region or can be distributed across various geographic locations, thereby forming various Points-of-Presence (PoPs) of the distributed platform. The content that is stored to the set of storage servers 210 can include files encoding applications, media, data, scripts, configurations, etc. of the distributed platform or customers of the distributed platform.

The administrative servers 220 provide the portals and interfaces with which customers of the distributed platform specify what content they want offloaded to the set of storage servers 210. The administrative servers 220 then configure one or more of the set of storage servers 210 accordingly. Also, the portals and interfaces can be used to issue various commands and operations (hereinafter collectively referred to as operations), such as loads and purges, to the set of storage servers 210.

When distributed platform customers issue purge operations to the administrative server 210, the administrative server 210 forwards some or all of those purge operations to the purge control servers 230. In some embodiments, the purge control servers 230 are physical machines that operate independent of the administrative server 220. In some such embodiments, the delineation of the purge control servers 230 from the administrative server 220 is a physical delineation. In some other embodiments, the function and operation of the purge control servers 230 is combined on the same set of hardware executing the administrative server 220 function and operation. In some such embodiments, the delineation of the purge control servers 230 from the administrative server 220 is a virtual delineation.

The purge control servers 230 control the dissemination of the purge operations across the set of storage servers 210. The purge control servers 230 also monitor the execution status of the purge operations. In so doing, the purge control servers 230 centrally manage operation execution when a purge operation involves two or more storage servers and execution status of that purge operation is dependent on all the involved storage servers performing the purge operation. The purge control servers 230 can also reduce the load on the set of storage servers 210 by grouping related purge operations before forwarding the purge operation groupings to the set of servers 210. Moreover, the purge control servers 230 can queue the purge operations until the set of storage servers 210 are ready to act on them.

In some embodiments, the purge control servers 230 push the purge operations to the set of servers 210 as they are received or on a periodic basis (e.g., every five seconds). In some other embodiments, the set of storage servers 210 are configured to pull the purge operations from the purge control servers 230. The set of storage servers 210 can be configured to pull the purge operations periodically or whenever they have sufficient bandwidth or resources to do.

Figure 3:
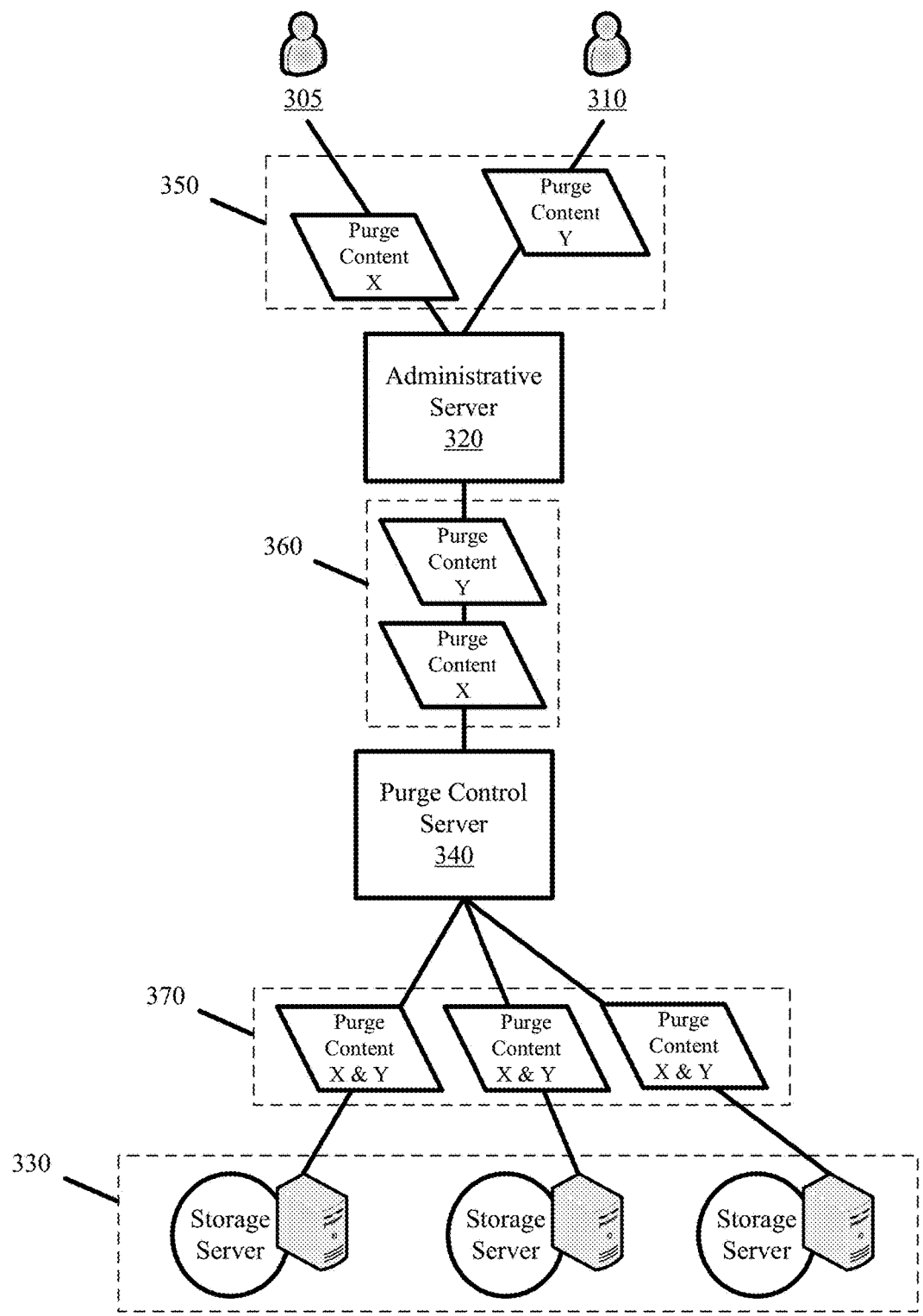
FIG. 3 illustrates a push methodology whereby the purge control servers push operations to the set of storage servers in accordance with some embodiments.

FIG. 3 illustrates the push methodology whereby the purge control servers push purge operations to the set of storage servers in accordance with some embodiments. As shown, first and second users 305 and 310 log in to the administrative server 320 and each submit (at 350) a purge operation to purge their respective content from the set of storage servers 330.

The administrative server 320 forwards (at 360) the purge operations to the purge control server 340. The purge control server 340 groups the operations of the first user 305 with the operations of the second user 310. This may occur when the purge control server 340 pushes operations to the set of storage servers 330 on a periodic basis (e.g., every five seconds) and both operations are received from the administrative server 320 before expiration of the period. Upon expiration of the period, the purge control server 340 pushes (at 370) the group of operations to each server of the set of storage servers 330. In some embodiments, the purge control server 340 establishes a secure connection (i.e., Secure Shell (SSH) connection) with a storage server before pushing the operation or group of operations to that storage server.

After pushing the operations to the set of storage servers 330, the purge control server 340 begins polling the set of storage servers 330 for execution status of the operations. Once the purge control server 340 receives confirmation that the purge has been executed by all servers, the purge control server 340 provides confirmation to the administrative server 320 which then updates the first user 305 and the second user 310 respectively.

Figure 4:
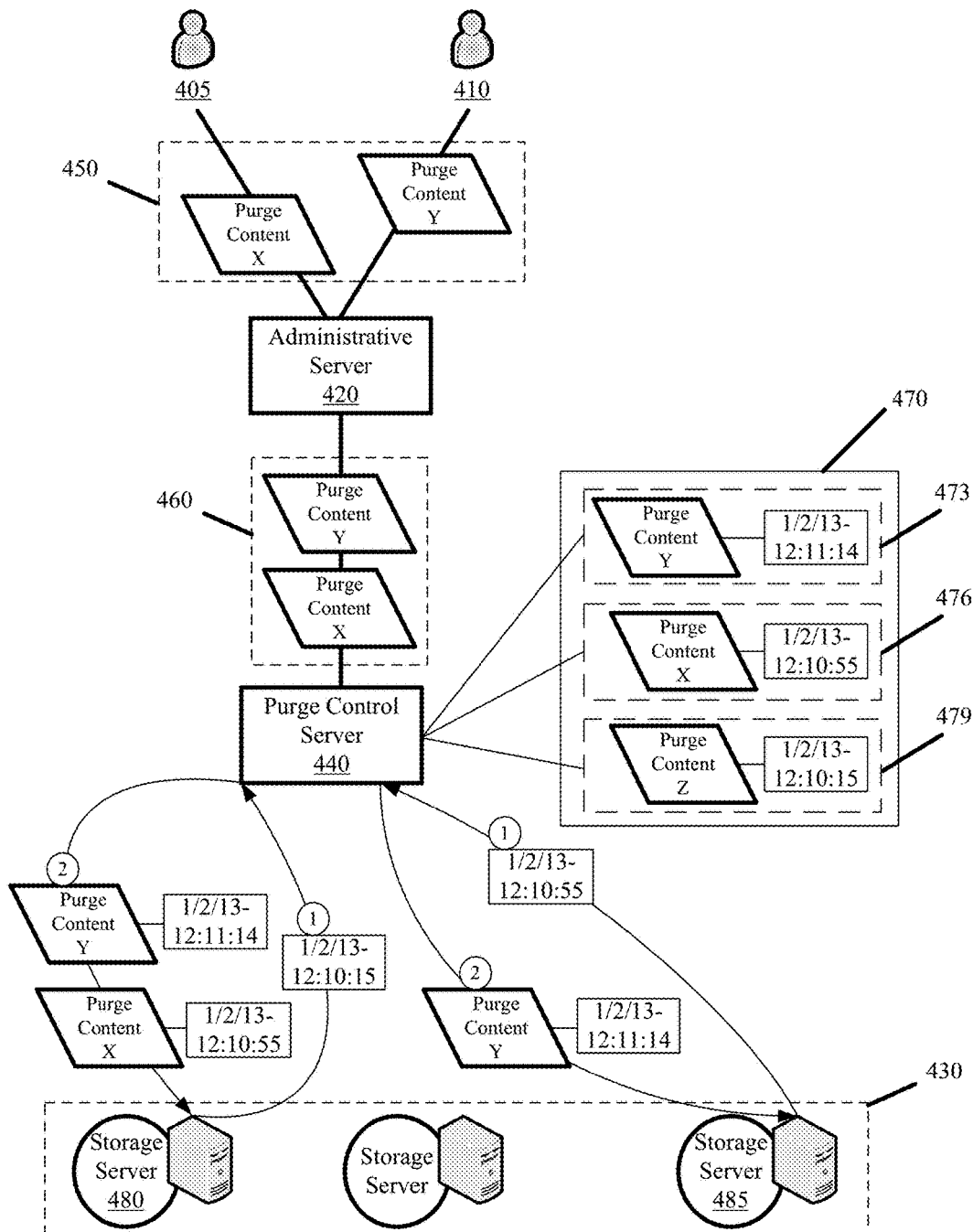
FIG. 4 illustrates a pull methodology in which each server of the set of storage servers pulls operations from the purge control servers in accordance with some embodiments.

FIG. 4 illustrates the pull methodology in which each server of the set of storage servers pulls purge operations from the purge control servers. Here again, first and second users 405 and 410 log in to the administrative server 420 and each issue (at 450) a purge operation to purge their respective content from the set of storage servers 430.

The administrative server 420 forwards (at 460) the purge operation to the purge control server 440. The purge control server 440 timestamps each user's purge operation as the operation is received from the administrative server 420 and enters (at 470) the timestamped purge operations to a queue. As shown, the queue includes three timestampted purge operations 473, 476, and 479, wherein the timestamped purge operation 473 is a purge operation that is issued by some user other than the first user 405 or the second user 410, wherein the timestamped purge operation 476 is the purge operation that is issued by the first user 405, and wherein the timestamped purge operation 479 is the purge operation that is issued by the second user 410.

In this pull scenario, each storage server of the set of storage servers 430 is configured to retrieve new operations from the purge control server 440 at a particular interval or when it is ready to do so. For example, a storage server may retrieve the operations from the purge control server 440 when it has sufficient bandwidth or resources to execute the operations. Also, the set of storage servers 430 may be configured to pull the operations from the purge control server 440 in a staggered fashion so as to not overwhelm the purge control server 440 and so that all of the storage servers are not simultaneously performing the same operations.

To pull operations from the purge control server 440, a storage server establishes a connection with the purge control server 440. In some embodiments, the storage server establishes a secure connection, such as an SSH connection, with the purge control server 440. The storage server then submits the timestamp for the last operation it performed to the purge control server 440. The purge control server 440 responds by passing one or more operations with newer timestamps to the storage server. As shown in the figure, a first storage server 480 of the set of storage servers 430 initiates a pull of operations 476 and 479 by passing the timestamp for operation 473 to the purge control server 440. A second storage server 485 of the set of storage servers 430 initiates a pull of operation 479 by passing the timestamp for operation 476 to the purge control server 440. Because of the different received timestamps, the purge control server 440 responds to each of the first storage server 480 and the second storage server 485 differently.

Figure 5:
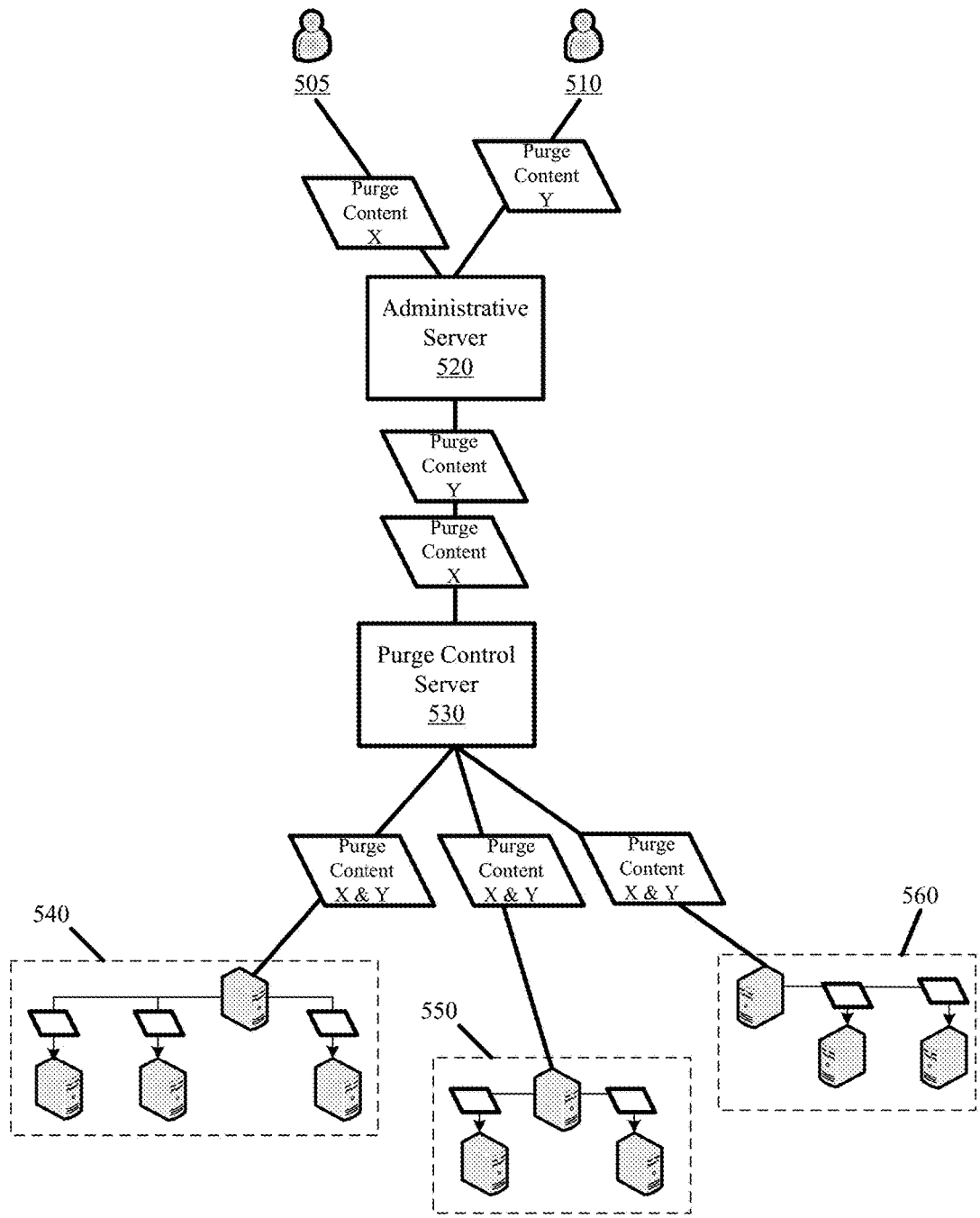
FIG. 5 presents an optimized architecture that reduces the load and overhead on the purge control server when distributing the purge operations across the set of storage servers using either of the push or pull methodologies.

FIG. 5 presents an optimized architecture that reduces the load and overhead on the purge control server when distributing the purge operations across the set of storage servers using either of the push or pull methodologies that were presented above. FIG. 5 illustrates users 505 and 510 and a distributed platform comprising: administrative server 520, purge control server 530, and different Points-of-Presence (PoPs) 540, 550, and 560. Each PoP 540, 550, and 560 is a set of collocated storage servers that service a geographic region more optimally than the servers of other PoPs.

When operating according to the push methodology, the purge control server 530 selects one storage server from each PoP 540, 550, and 560. The purge control server 530 establishes a connection with the selected storage server of each PoP 540, 550, and 560 and the purge control server 530 pushes one or more purge operations to each of the selected storage servers. The selected storage server within each PoP 540, 550, and 560, then distributes the purge operations to the other storage servers that are in the same PoP as the selected storage server.

When operating according to the pull methodology, one storage server from each PoP 540, 550, and 560 is designated to pull purge operations from the purge control server 530. Periodically, the designated storage server establishes a connection with the purge control server 530, sends a timestamp for the most recently received purge operation to the purge control server 530, and receives any newer purge operations that have since been issued to the purge control server H30. The designated storage server then distributes the received purge operations to the other storage servers of the same PoP.

The architecture of FIG. 5 reduces load and overhead on the purge control server 530 by reducing the overall number of connections made between the purge control server and the storage servers of the distributed platform. Instead of establishing a connection with each storage server, the purge control server in FIG. 5 establishes a connection with only storage server of each PoP.

Figure 6:
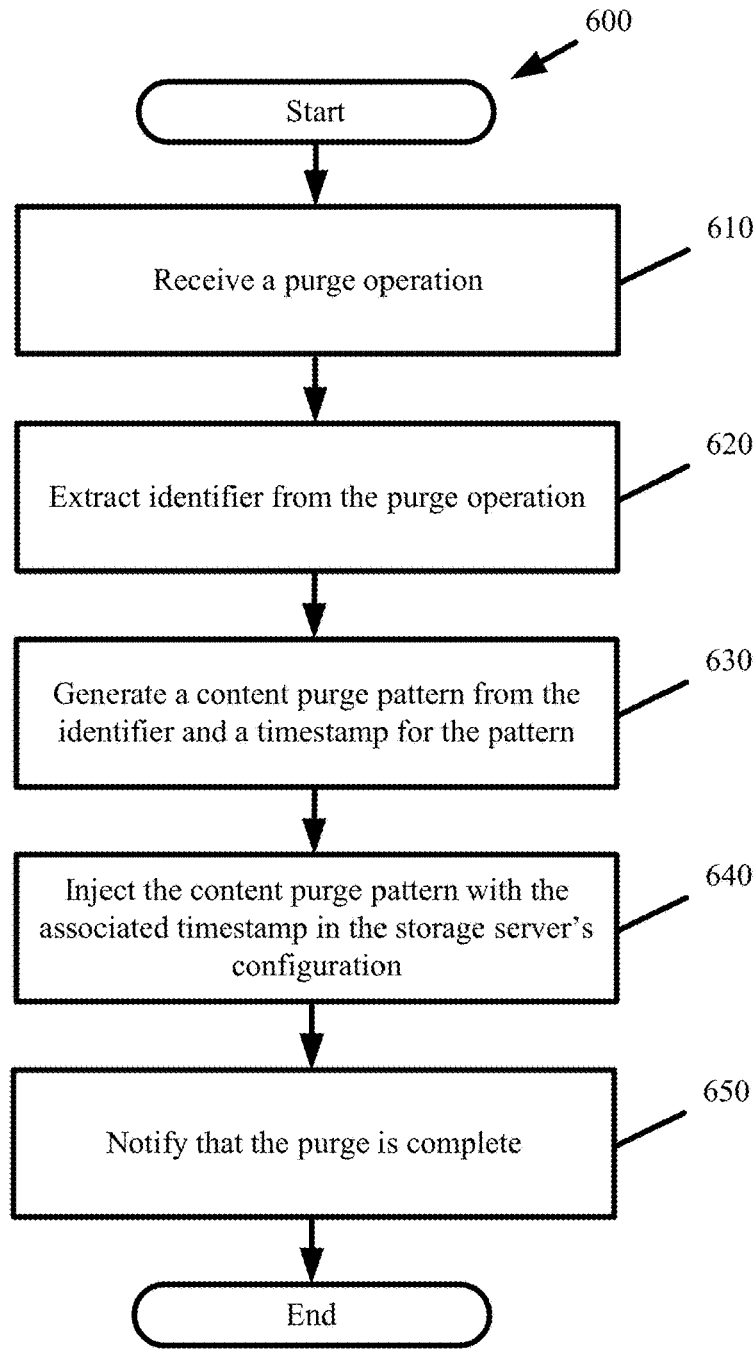
FIG. 6 presents a process performed by a storage server to instantiate instantaneous and non-blocking purge operation in accordance with some embodiments.

The above described architectures and methodologies work in combination with the optimized purge methodologies set forth herein to accomplish instantaneous and non-blocking purging within the distributed platform. FIG. 6 presents a process 600 performed by a storage server to instantiate instantaneous and non-blocking purge operation in accordance with some embodiments.

The process 600 commences when the storage server receives (at 610) a purge operation according to one of the push or pull methodologies. The purge operation may be received from the purge control server of the distributed platform or from another storage server. The purge operation provides an identifier identifying the content or one or more files that are to be purged. In some embodiments, the identifier is a Uniform Resource Location (URL), but can alternatively include a Uniform Resource Identifier (URI), Uniform Resource Name (URN), a filename, or a directory path with or without a filename. In some embodiments, the purge operation may also include or specify headers, http scheme (i.e., https or http), request content (for POSTs), geographical location, and other information usable to identify the content being purged. The purge operation need not be restricted to a single instance of content. The purge operation can specify multiple content or files that are to be purged using wildcard characters as one example.

After receiving the purge operation, the storage server extracts (at 620) the identifier from the purge operation. The process then generates (at 630) a content purge pattern and a timestamp for the content purge pattern. The content purge pattern identifies the content that is to be purged. One content purge pattern can also identify multiple content or files. In some embodiments, the content purge pattern is a character sequence used in pattern matching, wherein the character sequence identifies the one or more content that is to be purged. In some embodiments, the content purge pattern is a regular expression. A content purge pattern generator executes on each storage server to generate the content purge patterns from the content identifiers. In some embodiments, the content purge pattern generation is offloaded from the storage servers and is instead performed by the purge control servers. In some such embodiments, the purge control servers pass the generated content purge pattern as the identifier in the purge operation instead of the URL.

The process injects (at 640) the content purge pattern with the associated timestamp in the storage server's configuration. The configuration directs operation of the storage server. It specifies caching logic to control the caching function (e.g., what content the storage server is to cache, where to cache the content, etc.), monitoring logic to control the monitoring function, and reporting logic to control the reporting function of the storage server as some examples. In some embodiments, the process injects the content purge pattern by posting it via HTTP to the storage server, modifying the caching logic of the storage server configuration. It should be noted that the content purge pattern generation at 630 and injection at 640 are done in parallel and without blocking the storage server's primary task of responding to content requests.

As will be described below with reference to FIG. 7, once the content purge pattern is injected into the storage server configuration, the content identified by that injected content purge pattern is effectively purged. Accordingly, the process notifies (at 650) that the purge of the identified content is complete and the process ends. The storage server can provide the notification to the purge control servers or other storage servers of the distributed platform.

Figure 7:
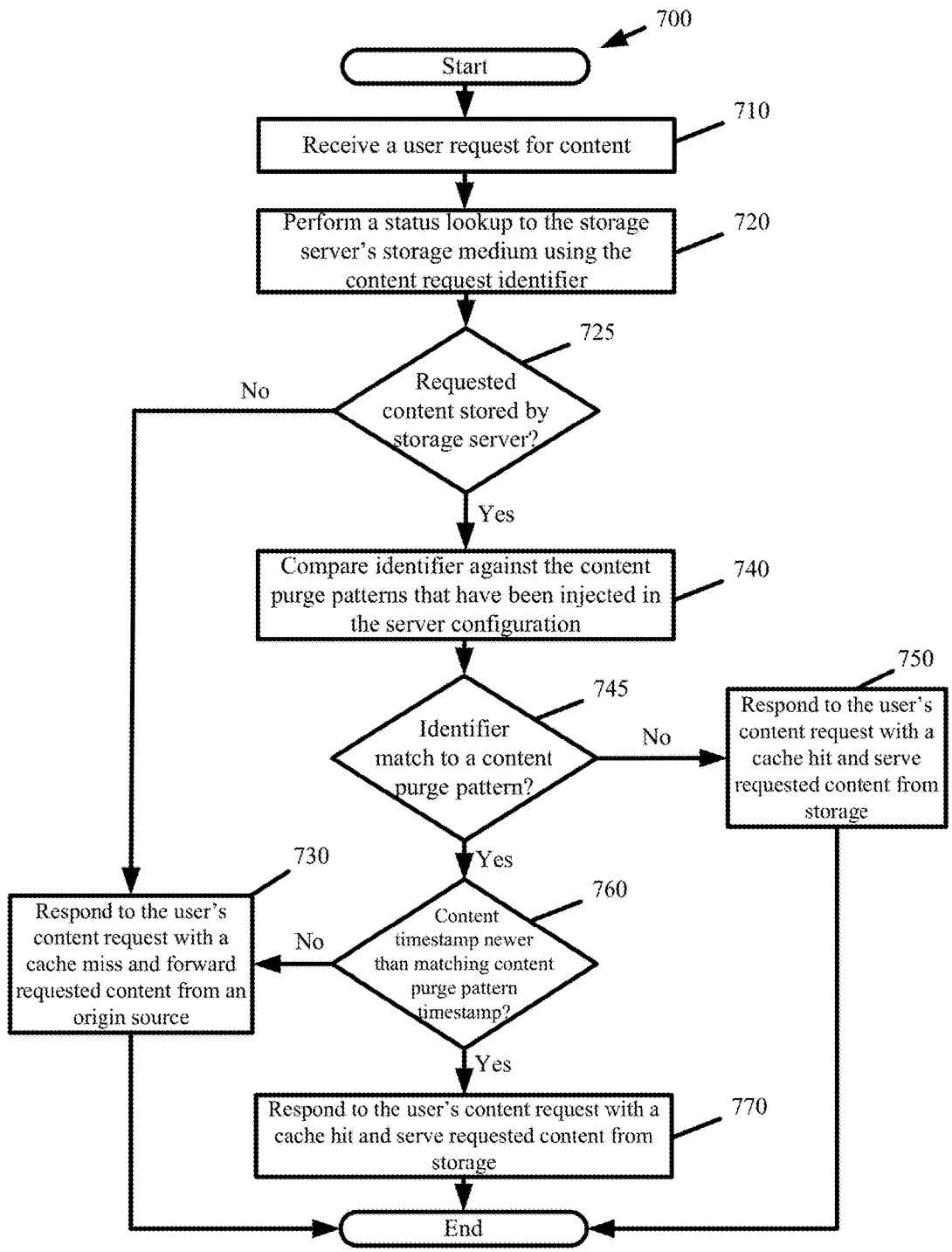
FIG. 7 presents a runtime process by which a storage server performs instantaneous non-blocking purging after its configuration is injected with one or more of the content purge patterns in accordance with some embodiments.

FIG. 7 presents a runtime process 700 by which a storage server performs instantaneous non-blocking purging after its configuration is injected with one or more of the content purge patterns in accordance with some embodiments. The process 700 begins when the storage server receives (at 710) a user request for content. The user request provides an identifier that identifies the content that is requested by the user. The identifier is usually a URL. The user request can take the form of an HTTP GET request as one example.

Using the content request identifier, the process performs (at 720) a status lookup to the storage server's storage medium. The status lookup is performed using a function call that determines if the content is stored on the storage server's storage medium and, if so, the function call retrieves content parameters. One such content parameter is the timestamp for when the content was last updated or stored to the storage medium. In some embodiments, the process performs the status lookup by invoking a "stat" system function. The identifier from the user request is passed as a parameter to the stat function. Based on the result of the status lookup, the process determines (at 725) whether the content is or is not stored to the local storage medium of the storage server.

When the status lookup reveals that the content is not stored to the local storage medium of the storage server, the process avoids the purge issue altogether. There is no need to determine whether the requested content has been designated for purging, because the requested content does not exist (i.e., has not yet been stored) on the storage server. Accordingly, the process responds (at 730) to the user's content request as it would for a cache miss. Specifically, the process retrieves the requested content from an origin source, caches the retrieved content, and passes the retrieved content to the requesting user. The origin source can be another storage server of the distributed platform or can be a server that is operated by a content provider, wherein the content provider contracts the distributed platform to host and distribute the content provider's content.

When the status lookup reveals that the content is stored to the local storage medium of the storage server, the process addresses the purge issue. To do so, the process, contemporaneously or simultaneously with the performance of the status lookup, compares (at 740) the extracted content request identifier against the content purge patterns that have been injected into the storage server configuration. The comparison determines (at 745) whether the identifier matches any of the injected content purge patterns.

If the identifier does not match a single content purge pattern, the content being requested has not been designated for purging. Accordingly, the process responds (at 750) to the user request as it would for a cache hit by passing the requested content from storage.

Otherwise, the identifier matches at least one content purge pattern, in which case the content being requested has been designated for purging. As was noted above, the content purge patterns provide an effective purging of the content, but not necessarily a physical purging of the content. To determine if the content has been physically purged, the process compares (at 760) the timestamp for the copy of the requested content that is stored by the storage server with the matching content purge pattern's timestamp.

Should the timestamp of the content be newer than the timestamp of the matching content purge pattern, it is an indication that the content has already been physically purged and that a new copy of the content has been stored to the storage medium. This refreshing of the content may have occurred as a result of a prior request for the same content that was received by the storage server after having been injected with the matching content purge pattern. The refreshing of the content may also have occurred as a result of an expiration of a time-to-live parameter associated with the content or a purge routine that physically removes old content from the storage medium when the resource usage of the storage server falls below a designated threshold. In such cases, the storage server responds (at 770) to the user request as it would for a cache hit by passing the new copy of the content from cache or storage.

Should the timestamp of the content be older than the timestamp of the matching content purge pattern, it is an indication that the content has not been physically purged. In this case, the storage server responds (at 730) to the user request according to a cache miss. As such, the process retrieves the requested content from an origin source, caches the retrieved content, and passes the retrieved content to the requesting user. In caching the requested content, the storage server replaces the previous copy of the content and stores the new copy with an updated timestamp.

If the storage server does not receive a request that results in a cache miss and that initiates the physical purge, the server physically removes the designated content after a specified time interval and/or when sufficient free resources are available. In such cases, the effective purge continues to occur in the non-blocking instantaneous manner by way of the content purge pattern being injected in the server's configuration. The physical purge, however, is delayed and can be conducted as a batch purge should a subsequent request for that content not arrive within the specified time interval resulting in a cache miss.

Prior to processes 600 and 700, distributed platforms relied on purge methodologies that were blocking and not instantaneous. Using these methodologies, a purge would be deemed complete when the write operation to physically remove the designated content from the server's storage was performed. However, performing the purge was potentially a blocking operation, because the server's primary task of responding to content requests could be interrupted in order to perform the write operation. Conversely, the write operation could be delayed until the server completes its primary task and the server experienced a period of downtime or resource availability during which time it could then perform the write operation to purge the content. Waiting for the write operation to complete also prevented the purges from being instantaneous as write operations are relatively slow operations in-and-of themselves. This delay is be exacerbated when the server waits until it has the necessary resource availability to perform the write without interrupting primary server function.

However, purging performed according to processes 600 and 700 overcomes these issues. Purges become instantaneous once a content purge pattern for content is generated and injected into the server configuration. The content purge pattern generation and injection is done in parallel with the server responding to content requests, such that the server's primary task is not blocked at any time. After injecting the content purge pattern to the server configuration, the server immediately treats the next request for the matching content as a cache miss, thereby preventing any content consumer from accessing a cached copy of that content from the server. The result of the cache miss is the same as if the content was physically removed from the server. Moreover, the effective purge and physical purge occur inline with the server's primary task of responding to content requests and addressing cache misses.

Figure 8:
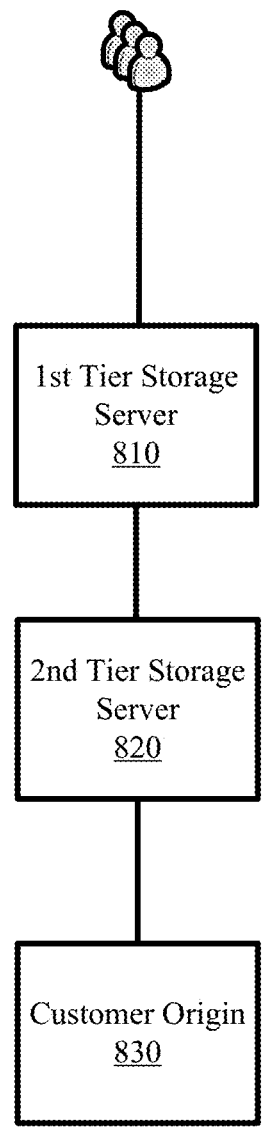
FIG. 8 illustrates a multi-tiered distributed platform.

The instantaneous non-blocking methodologies of some embodiments can also be adapted for multi-tiered distributed platforms. In a multi-tiered distributed platform, race conditions and multiple cached instances of the same content make it difficult to ensure that content is purged from all server tiers. FIG. 8 illustrates one such multi-tiered distributed platform. The illustrated multi-tiered distributed platform has a first tier storage server 810 and a second tier storage server 820. A content request is first routed to the first tier storage server 810. If the first tier storage server 810 does not have the requested content cached, it will forward the request to the second tier storage server 820. The second tier storage server 820 then responds to the request by passing the requested content from its cache when a copy is cached locally or by retrieving the requested content from an origin source 830 when the content is not cached at the second tier storage server 820.

Using prior art purge methodologies and because of the delays associated with purging content according to those methodologies, it is possible that content that is purged from a first tier is reintroduced at the first tier by a second tier that has not yet completed the purge. For example and with reference to FIG. 8 above, a purge operation may be issued to remove particular content from both the first tier storage server 810 and second tier storage server 820. The first tier storage server 810 may complete the purge operation and then receive a request for the particular content before the second tier storage server 820 completes the purge operation (because the second tier storage server 820 is waiting for available resources). In this case, the first tier storage server 810 does not have requested content cached because it performed the purge operation. Accordingly, the first tier storage server 810 forwards the request to the second tier storage server 820. However, the second tier storage server 820 has not yet performed the purge operation, and therefore responds by passing its stale cached copy of the particular content back to the first tier storage server 810 which then reintroduces the stale cached copy to its cache and to the requesting end user.

To resolve such issues while still realizing instantaneous and non-blocking purging, some embodiments introduce a "flow-through" parameter. The flow-through parameter is a value that is introduced into the content request header before it is forwarded from one tier to a next tier in the multi-tier distributed platform. The flow-through parameter can, for example, be inserted as part of many different network layer (e.g., IP), transport layer (e.g., TCP), or application layer (e.g., HTTP) protocols.

The flow-through parameter is introduced by the first storage server in the tiered hierarchy that identifies the content being requested as one that should be purged based on a configured content purge pattern. Once introduced into the content request header, the flow-through parameter causes all subsequent storage servers in the tiered hierarchy to treat the forwarded content request as a cache miss based on a quick examination of the content request header. The last storage server in the tiered hierarchy, then retrieves a fresh copy of the requested content from an origin source outside the distributed platform, and the fresh copy is propagated back up through the storage server tiers until the fresh copy is passed back to the requesting user.

The flow-through parameter eliminates the potential for a storage server serving stale content because it has not yet received or processed a purge operation. Moreover, the flow-through header increases efficiency as only one storage server in the tiered hierarchy identifies the requested content as one that is designated for purging using the configured content purge patterns. All subsequent tiers can avoid performing the content purge pattern lookup by simply identifying whether or not the flow-through parameter is set.

Nevertheless, the content purge patterns bring about many of the efficiencies realized in the purge methodologies of some embodiments. A single content purge pattern can identify multiple content or content files associated with a wildcard purge operation or two or more contemporaneously issued purge operations that affect related but different content. The content purge pattern also covers the use case when a purge operation is issued without specifying the exact URL for the content that is designated for purging. This occurs when the purge operation is issued to cover all variants of content or a content file. Different content may have different query string variants, compression variants, etc. For example, the storage server may store a first version of content that is optimized for mobile devices and a second version of content that is optimized for desktop devices and a single purge operation is issued to purge all such variants.

FIG. 9 provides an example illustrating content purge pattern generation from various content identifiers in accordance with some embodiments. As shown, each content identifier 910 and 920 is a URL. In this example, each URL includes a wildcard character.

Some embodiments convert the identifiers 910 and 920 to cache keys 930 and 940 respectively. The cache key conversion maps the path identified in each URL to the corresponding path used by the storage server to store the identified content to its local storage medium. Various hashes may be used to perform this conversion and different storage servers may produce different cache keys depending on their storage path.

The cache keys 930 and 940 are then used in the content purge pattern generation. In this example, one content purge pattern 950 is generated to match against both cache keys 930 and 940. The same content purge pattern 950 is applied for two different paths 960 and 970 in which the content may be stored. A customer identifier 980 is also associated with the content purge pattern 950. In some embodiments, the customer identifier 980 is encoded within the purge operation URL or identifier (e.g., 910 or 920). As will be explained in greater detail below, the customer identifier 980 is used to minimize the number of content purge patterns that each content request is compared against.

Also, a batch identifier 990 and a timestamp 995 are associated with the content purge pattern 950. In some embodiments, the content purge pattern timestamp 995 serves as a time-to-live parameter for retaining the content purge pattern 950 in the storage server configuration. When the content purge pattern timestamp 995 expires, the content purge pattern 950 that is associated with that timestamp 995 is removed from the storage server configuration. This ensures that the storage server has sufficient time to perform the physical purge while also ensuring that the storage server configuration is periodically truncated. It should be noted that if a content request having an identifier matching to an injected content purge pattern is not received before the timestamp 995 or other timer expires, the server queues the content identified by the content purge pattern for purging and performs the purge when sufficient resources are available.

In some embodiments, each storage server controls how a new content purge pattern is injected into its configuration. The storage server does so in order to hierarchically organize the different content purge patterns. This hierarchical organization reduces the number of content purge patterns comparisons that are performed for each incoming content request.

FIG. 10 illustrates an exemplary content purge pattern hierarchical organization in accordance with some embodiments. The figure conceptually illustrates a portion of a storage server configuration in which the content purge patterns are injected in the hierarchically organized manner.

At the topmost level, the content purge patterns are organized on a per customer basis. A customer identifier (i.e., Customer ID) 1010 identifies the customer whose content is identified by the content purge pattern. The distributed platform generates and associates a customer identifier to each customer that registers for the distributed platform services. The customer identifier is usually included as part of the URL or content identifier that is submitted in a content request. The customer identifier allows the storage servers to differentiate between a first customer's content and a second customer's content when such content is otherwise named identically. Underneath the customer identifier, the configuration organizes the content purge pattern into a path hierarchy (e.g., 1020) that is representative of the directory path leading to the content's location on the server's storage medium. In any path that contains two or more content purge patterns, the content purge patterns are ordered according to their timestamps (e.g., 1030 and 1040) to ensure that a content purge pattern with a newer timestamp is performed instead of a content purge pattern with an older timestamp when a content identifier matches the patterns defined for both content purge patterns.

Based on this hierarchical organization of content purge patterns, a server compares a content identifier only against the content purge patterns that were generated from purge operations issued by the customer providing the content to the distributed platform. The server can avoid comparing that content identifier against all other content purge patterns that were generated from purge operations issued by other customers of the distributed platform.

Many of the above-described functionality and components are implemented as software processes that are specified as a set of instructions recorded on a non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer readable media include, but are not limited to, CD-ROMs, flash drives, RAM chips, hard drives, EPROMs, etc.

Figure 11:
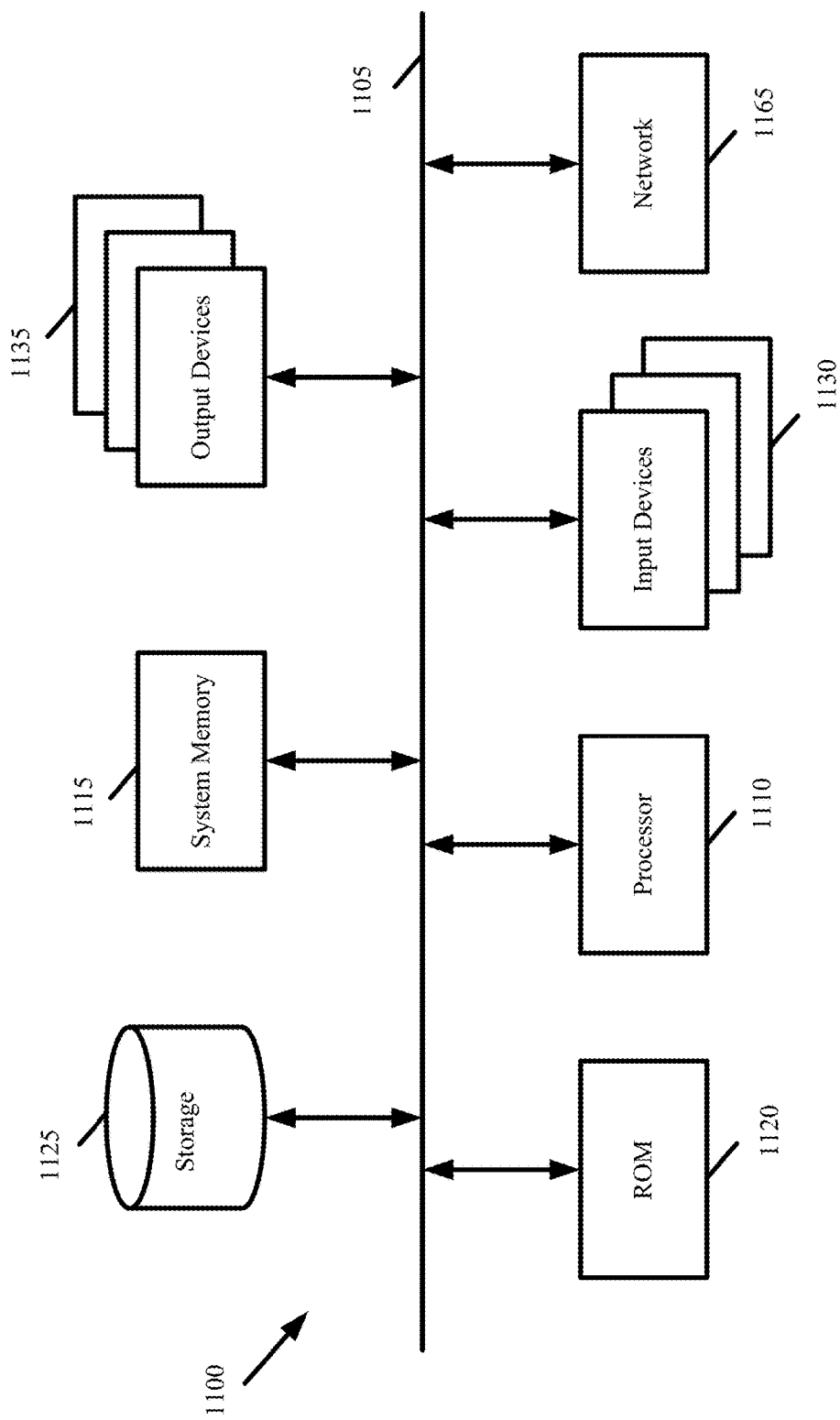
FIG. 11 illustrates a computer system or server with which some embodiments are implemented.

FIG. 11 illustrates a computer system or server with which some embodiments are implemented. Such a computer system includes various types of computer readable mediums and interfaces for various other types of computer readable mediums that implement the various processes and modules described above (e.g., storage server, purge control servers, etc.). Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include alphanumeric keypads (including physical keyboards and touchscreen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for non-blocking content purging, the method comprising:
    caching a plurality of content to memory of a content distribution server with a first timestamp corresponding to a time at which each content of the plurality of content is cached to the memory;
    providing, by the content distribution server, a different second timestamp to a command designating removal of particular content from said memory, wherein the particular content is part of the plurality of content cached to said memory, and wherein the second timestamp corresponds to a time at which the command is received at the content distribution server;
    maintaining a copy of the particular content in said memory in response to said command and before the content distribution server receives a user request for the particular content;
    receiving by the content distribution server, a user request for the particular content; and
    executing by the content distribution server, a cache miss, in response to the user request, based on the first timestamp of the particular content being older than the second timestamp of the command, wherein executing the cache miss comprises replacing the copy of the particular content in said memory with an updated copy retrieved from an origin server and sending the updated copy in answer to the user request.

2. The computer-implemented method of claim 1 further comprising executing a cache hit, in response to the user request, based on the first timestamp of the copy of the particular content being newer than the second timestamp of the command, wherein executing the cache hit comprises sending the copy of the particular content from said memory in answer to the user request.

3. The computer-implemented method of claim 1 further comprising entering the command into a configuration of the content distribution server without physically purging the copy of the particular content from said memory.

4. The computer-implemented method of claim 3, wherein entering the command comprises entering at least one of a Uniform Resource Locator (URL) or pattern into said configuration, wherein the URL matches said pattern.

5. The computer-implemented method of claim 4, wherein executing the cache miss further comprises matching a URL from the user request to the URL or the pattern from said configuration.

6. The computer-implemented method of claim 1, wherein the command is a first command comprising a first identifier identifying the particular content, the method further comprising receiving a second command comprising a second identifier identifying different content from the plurality of content, and generating a regular expression in response to receiving said first command and said second command, wherein the regular expression matches at least to the first identifier and the second identifier, and wherein executing the cache miss further comprises determining an identifier from the user request matches to said regular expression.

7. A computer-implemented method comprising:
    receiving at a content distribution server, a set of content request identifiers designating removal of a set of cached content from memory of the content distribution server;
    generating by the content distribution server, a single pattern as a substitute for the set of content request identifiers, the single pattern comprising a character sequence matching each content request identifier from the set of content request identifiers;
    receiving at the content distribution server, a first user request and a second user request, the first user request comprising a first content request identifier identifying first content from the set of cached content, and the second user request comprising a second content request identifier identifying second content from the set of cached content; and
    responding to each of the first user request and the second user request with a cache miss from the content distribution server in response to the first content request identifier and the second content request identifier matching to the character sequence of the single pattern.

8. The computer-implemented method of claim 7, wherein responding to the first user request comprises retrieving a fresh copy of the first content from an origin source and serving the fresh copy of the first content from the origin source in place of an existing copy of the first content cached in said memory.

9. The computer-implemented method of claim 8, wherein responding to the first user request further comprises replacing the existing copy of the first content cached in said memory with the fresh copy from the origin source and updating a timestamp of the first content.

10. The computer-implemented method of claim 7 further comprising caching the set of cached content to memory and retaining a cached copy of each of the first content and the second content in said memory in between said receiving the set of content request identifiers and said responding to each of the first user request and the second user request.

11. The computer-implemented method of claim 8 further comprising responding to a third user request with a cache hit from the content distribution server in response to a third content request identifier from the third user request not matching to the character sequence of the single pattern, wherein responding with the cache hit comprises serving said third content from memory.

12. The computer-implemented method of claim 9 further comprising responding to a third user request with a cache miss from the content distribution server in response to a third content request identifier from the third user request not matching to the character sequence of the single pattern and a time-to-live parameter of the third content expiring.

13. The computer-implemented method of claim 10 further comprising purging the set of content from said memory in response to resources of the content distribution server falling below a threshold.

14. The computer-implemented method of claim 11, wherein said single pattern is a regular expression, and the character sequence comprises at least one wildcard character.

15. The computer-implemented method of claim 12 further comprising effectively purging the set of content without physically purging any content from the set of content prior to said responding, wherein effectively purging the set of content comprises modifying content distribution server responses to requests for content from the set of content from cache hits to cache misses.

16. A device comprising:
a cache memory;
a non-transitory computer-readable medium storing a set of processor-executable instructions; and
one or more processors configured to execute the set of processor-executable instructions, wherein executing the set of processor-executable instructions causes the one or more processors to:
cache a plurality of content to memory to the cache memory with a first timestamp corresponding to a time at which each content of the plurality of content is cached to the cache memory;
provide a different second timestamp to a command designating removal of particular content from the cache memory, wherein the particular content is part of the plurality of content cached to the cache memory, and wherein the second timestamp corresponds to a time at which the command is received at the content distribution server;
maintain a copy of the particular content in the cache memory in response to the command and before the content distribution server receives a user request for the particular content;
receive a user request for the particular content; and
execute a cache miss, in response to the user request, based on the first timestamp of the particular content being older than the second timestamp of the command, wherein executing the cache miss comprises replacing the copy of the particular content in the cache memory with an updated copy retrieved from an origin server and sending the updated copy in answer to the user request.

* * * * *